Patented Aug. 27, 1940

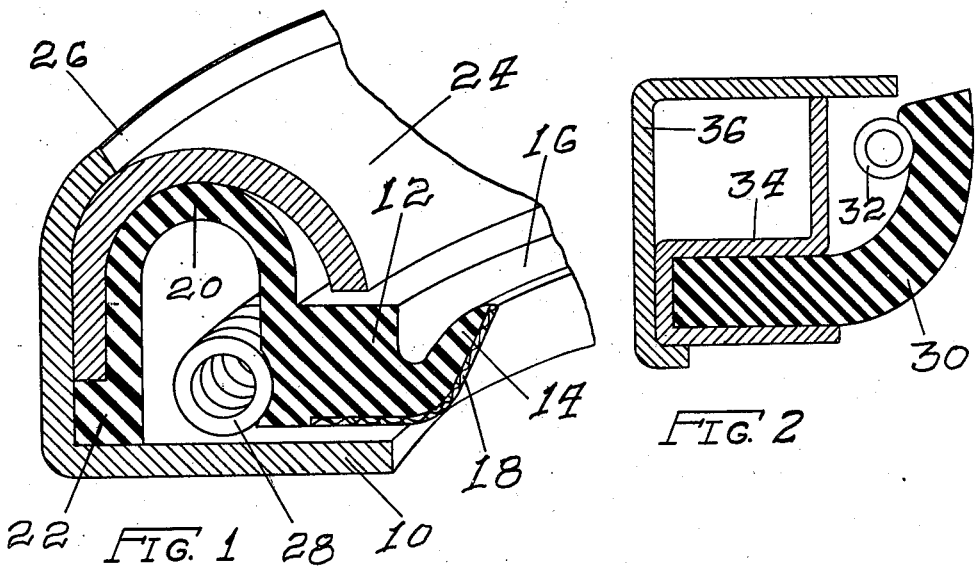
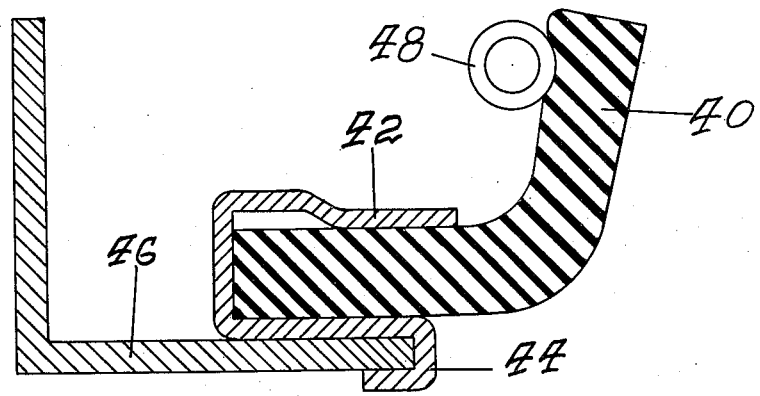
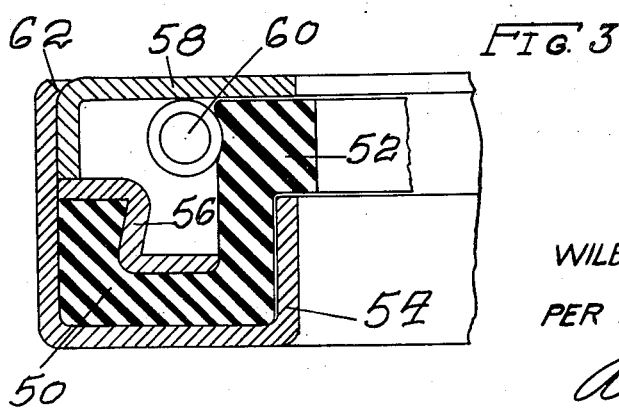

2,213,116

UNITED STATES PATENT OFFICE 2,213,116

FLEXIBLE OIL SEAL

Wilburn F. Bernstein, Brookfield, Ill., assignor to Victor Manufacturing & Gasket Company, Chicago, Ill., a corporation of Illinois Application January 28, 1939, Serial No. 253,325

2 Claims. (Cl. 288—3)

This invention relates to an improved flexible oil seal and has for one of its principal objects, the provision of an oil seal or grease retainer which is so constructed that it will operate satisfactorily on rotating shafts, even when such shafts are quite a bit off center or eccentric, which eccentricity may be due to any one of several reasons.

Another important object of the invention is the provision of an oil seal or grease retainer which includes as essential elements thereof, a metallic shell or support and a flexible diaphragm or sealing element, and possibly also a garter spring for more satisfactorily binding and retaining the sealing element into actual sealing contact with the shaft.

Another and further important object of the invention resides in the assembly of the shell, diaphragm and spring in such a manner as to produce a compact, unitary structure, while at the same time avoiding the necessity of actually vulcanizing or otherwise binding the sealing element to any portion of the metal.

Another and still further important object of the invention is to provide a flexible sealing element for grease retainers or the like, which is composed of synthetic rubber or some similar material, and which can be produced in molds and in production quantities in an economical manner and in such styles that a sealing element for a certain size shaft may be readily used on any of such shafts, regardless of the size of the containing recess in the housing which surrounds such a shaft.

Other and further important objects of the invention will be apparent from the disclosures in the accompanying drawing and following specification.

The invention, in a preferred form, is illustrated in the drawing and hereinafter more fully described.

In the drawing:

Figure 1 is a sectional view of one of the improved flexible oil seals of this invention, showing the metallic container or the shell, the flexible sealing element and the garter spring.

Figure 2 is also a sectional view, illustrating a somewhat different type of invention.

Figure 3 shows a further modified form, illustrating particularly the adaptation of a single size of diaphragm to various types of metallic holders.

Figure 4 is a sectional view, illustrating a still further modification of the invention, and one which is especially adapted for heavy duty.

As shown in the drawing:

The reference numeral 10 indicates generally the containing shell of one of the preferred types of oil seals of this invention, the same being annular and cup-shaped, as shown, and adapted for the reception thereinto of a suitably shaped and designed flexible sealing element 12, which is preferably composed of synthetic rubber or the like, which readily lends itself to production for this type of work, and which can be accurately molded to desired size and shape, and which furthermore is proof against the softening action of oil or other fluids in connection with which it may be used.

The sealing element 12 is provided with an annular lip 14 defined by corresponding groove 16, and an inner face of the lip portion is preferably covered by means of some treated fabric, as illustrated at 18, thereby assuring of better wearing qualities.

That portion of the sealing element which is mainly contained within the shell 10, comprises essentially a U-shaped extension 20, which obviously provides for great flexibility of action, and the outer leg of this U-shaped extension terminates in a squared, annular edge 22, as illustrated, which fits into the corresponding angle of the shell portion 10.

In order to maintain this structure in the shell, a U-shaped, annular metal element 24 is provided, which fits into the outer shell 10, and which has one inner and longer leg extending into the space between the U-shaped portion of the sealing element and the corresponding inner face of the shell 10. This leg is seated against the shoulder formed by the squared edge 22, and the entire construction is held in properly assembled relationship by inturning or spinning down the upper edge 26 of the shell 10 against the adjacent face or portion of the U-shaped inner shell 24, all as illustrated in Figure 1.

The U-shaped extension 20 of the flexible sealing element also provides a space for the reception of a garter spring 28, which supplements the natural resiliency of the sealing element and acts to more definitely constrict the same about a shaft, thereby providing a very desirable sealing action.

It will be noted that a great flexibility of movement of the actual sealing portion of the diaphragm is provided by this construction, first, on account of the sealing lip 14, and second, on account of the U-shaped extension 20, and lastly, by the space which is provided between the inner edge of the U-shaped metal shell 24 and the corresponding opposed surface of the outer shell 10. This allows of a considerable lateral or sliding movement of the body portion 12 of the diaphragm with regard to the shell, and also allows somewhat of a to and fro movement, which has often been found to accompany an eccentricity or wobbling of a shaft when a sealing element is applied thereto. Unless some such freedom of movement is provided for the sealing element, any pronounced eccentricity of the shaft will soon completely destroy the sealing action.

A fluid seal of a somewhat simpler construction, but which will also act satisfactorily on eccentric shafts, is shown in Figure 2, and this comprises essentially a diaphragm or sealing element 30 shaped as shown, preferably composed of synthetic rubber, and the action of which is supplemented by garter spring or the like 32.

The sealing element itself is maintained in position by means of a metal holder 34, shaped as shown, and which is adapted to clamp the lateral extension of a sealing element between two integral legs thereof, as illustrated. This metallic clamping element is then preferably mounted in an outer shell 36, thereby providing a unitary oil seal structure which can be readily inserted in a recess or other space which is ordinarily provided therefor in housings which surround rotating shafts.

In Figure 3, a further modification is illustrated, wherein the flexible diaphragm or sealing element 40 is mounted in a metallic gripping member 42, shaped as shown, and this element 42 is provided with an extension 44 which can be grippingly positioned about the inner annular edge of an outer shell 46, which outer shell may be one of many sizes in order to accommodate various sizes of recesses. In this manner, flexible sealing elements to fit a certain size of shaft may be adapted to practically any size of adjacent recess in the shaft housing, while at the same time producing a simplified construction which, if desired, can be amplified for various types of work or structures. For example, shell 46 may be U-shaped instead of L-shaped, thereby providing a further and inner guard for the sealing element and also a containing recess for the garter spring 48.

In Figure 4 a heavy duty type of seal is provided, this including a unitary diaphragm or sealing element 50 somewhat S-shaped, as shown, with a square lip 52 for shaft-contacting purposes, and this is preliminarily fitted in a supporting shell 54, shaped as shown, and an inner, reinforcing and holding element 56 is then applied to the diaphragm in the shell, after which an L-shaped retainer 58 is fitted into the outer shell about the garter spring 60 and maintained in position by spinning down or turning in the upper edge 62 of the shell 54.

Here again is provided a great flexibility of action, particularly so far as the sealing lip or edge of the diaphragm 50 is concerned, while at the same time a remarkably solid support is provided, which also produces a construction which will be proof against any possibility of leakage between the containing shell and the outer edges of the diaphragm or sealing elements.

It is believed that herein is provided a type of seal which can be satisfactorily and adequately employed particularly in repair or replacement jobs, where, on account of wear, some eccentricities or irregularities in rotating shafts may be expected, and wherein at the same time a proper seal against leakage of oil or other fluids must be provided.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A flexible oil seal, including a metallic outer shell, a molded sealing element mounted therein, and means for allowing of a relative motion of a portion of the sealing element with respect to the outer shell, said means comprising a U-shaped extension of the sealing element and means for fastening the outer leg of said U-shaped extension in the shell, said fastening means comprising a metallic inner shell, also U-shaped to conform substantially to the contour of the U-shaped portion of the sealing element, the sealing element further comprising a substantially square body portion, said body portion being positioned adjacent the inner leg of the U-shaped metallic holder, and an annular, shaft-contacting lip extending inwardly from the square body portion of the sealing element.

2. A flexible oil seal, including a metallic outer shell, a molded sealing element mounted therein, and means for allowing of a relative motion of a portion of the sealing element with respect to the outer shell, said means comprising a U-shaped extension of the sealing element and means for fastening the outer leg of said U-shaped extension in the shell, said fastening means comprising a metallic inner shell, also U-shaped to conform substantially to the contour of the U-shaped portion of the sealing element, the sealing element further comprising a substantially square body portion, said body portion being positioned adjacent the inner leg of the U-shaped metallic holder, and an annular, shaft-contacting lip extending inwardly from the square body portion of the sealing element, together with reinforcing facing on the lip.

WILBURN F. BERNSTEIN.